US005391412A

United States Patent [19]

Long

[11] Patent Number: 5,391,412

[45] Date of Patent: Feb. 21, 1995

[54] CONTINUOUS FORM

[76] Inventor: John A. Long, 41 Lamont Avenue, Scarborough, Ontario, Canada, M1S 1A8

[21] Appl. No.: 67,057

[22] Filed: May 26, 1993

Related U.S. Application Data

[63] Continuation-in-part of Ser. No. 35,702, Mar. 23, 1993, which is a continuation-in-part of Ser. No. 859,879, Mar. 30, 1992, abandoned, which is a continuation-in-part of Ser. No. 816,712, Jan. 3, 1992, Pat. No. 5,275,857, which is a continuation-in-part of Ser. No. 800,285, Nov. 29, 1991, Pat. No. 5,219,631.

[51] Int. Cl.[6] .......... B32B 3/10

[52] U.S. Cl. .......... 428/43; 428/136; 281/5; 462/26; 462/46

[58] Field of Search .......... 428/43, 131, 136; 281/5; 462/6, 26, 46, 52

[56] References Cited

U.S. PATENT DOCUMENTS 5,219,631 6/1993 Long .......... 428/43

5,275,857 1/1994 Long .......... 428/43

*Primary Examiner*—Alexander S. Thomas

[57] ABSTRACT

A continuous form has regularly longitudinal spaced transverse lines, each comprising a cut line or a line of perforation. The transverse lines extend from one edge of the form. The transverse lines are of uniform length of about one-third to one-half the width of the form. A scored line runs longitudinally along the inner end of the transverse lines. In one embodiment where the transverse lines are cuts, a transverse light line of perforation extends from the inner edge of each cut to the other edge of the form.

8 Claims, 6 Drawing Sheets

CONTINUOUS FORM

CROSS-REFERENCE TO RELATED APPLICATIONS

This application is a continuation-in-part of application No. 035,702, filed Mar. 23, 1993, which is a continuation-in-part of application No. 859,879, filed Mar. 30, 1992, now abandoned, which is a continuation-in-part of application No. 816,712, filed Jan. 3, 1992, now U.S. Pat. No. 5,275,857, which is a continuation-in-part of application No. 800,285, filed Nov. 29, 1991, now U.S. Pat. No. 5,219,631.

BACKGROUND OF THE INVENTION

1. Field of the Invention

This invention relates to a paper continuous form and to a paper web comprising a paper continuous form.

2. Description of the Related Art

Mass mailings generally rely upon apparatus to feed, cut and fold a continuous form into folded letter sheets for stuffing in an envelope. The continuous form is typically provided in a paper web having pin hole edges for tractor feeding of the web. Furthermore, the web may be perforated across its width at uniform intervals; in such case, the paper web is often referred to as "computer paper". One method of handling a paper web (with or without the noted transverse perforations) is as follows. The paper web is tractor fed to a separating station (if the web is transversely perforated) or a cutting station (if the web is not transversely perforated) and the separate sheets are then conveyed to a folding station whereat automatic arms first fold one marginal portion of the sheet over a medial portion of the sheet and then fold the remaining marginal portion of the sheet over the first mentioned marginal portion and the medial portion of the sheet. This results in a folded letter which has a standard letter fold. One drawback with this method is that once the individual sheets have been cut or separated from the continuous form it is difficult to keep them in registration in order to make the letter folds properly.

A second method of forming folded letters from the aforenoted paper web involves tractor feeding the web and then buckle folding the leading portion of the web subsequent to which the leading portion is severed from the web resulting in a folded letter sheet. One drawback with this approach is that it cannot be used where inserts have been adhered to the web ahead of the buckle folding station if such inserts are of significant thickness. Thus, for example, this method cannot be used where standard thickness credit cards (which are about 30 thousandth's of an inch in thickness) are attached to each sheet in the continuous form since the continuous form will then jam in the buckle folding rollers.

While not known to be used in the mass production of letter sheets, it is known to progressively fold webs along their length with edge guides which progressively urge a marginal portion of the web towards the center of the web. If this method were employed in the folding of the aforenoted paper web of computer paper (which typically has a width of about 9 ½ inches), it would require about an eight-foot run to complete a fold of a marginal portion of the web over the medial portion of the web without ripping the paper or causing it to separate at any transverse perforations. Space is generally extremely limited in mail rooms. This method would, therefore, be unsuitable in many mass mailing applications due to the large area that would be taken up by such machinery.

Accordingly, there remains a need for a continuous form more suitable for use in the mass production of letters.

SUMMARY OF THE INVENTION

Accordingly to the present invention, there is provided a paper continuous form, comprising: a first edge and an opposed second edge; a plurality of linear transverse cuts, each of said cuts extending in said continuous form from said first edge, said plurality of transverse cuts being of uniform length and being uniformly longitudinally spaced along said continuous form; a transverse light line of perforation extending from the inner end of each transverse cut to said second edge of said continuous form; each transverse cut being at least several times longer than any cut forming part of said light line of perforation.

BRIEF DESCRIPTION OF THE DRAWINGS

In the figures which disclose example embodiments of the invention.

DESCRIPTION OF THE PREFERRED EMBODIMENTS

Figure 1:
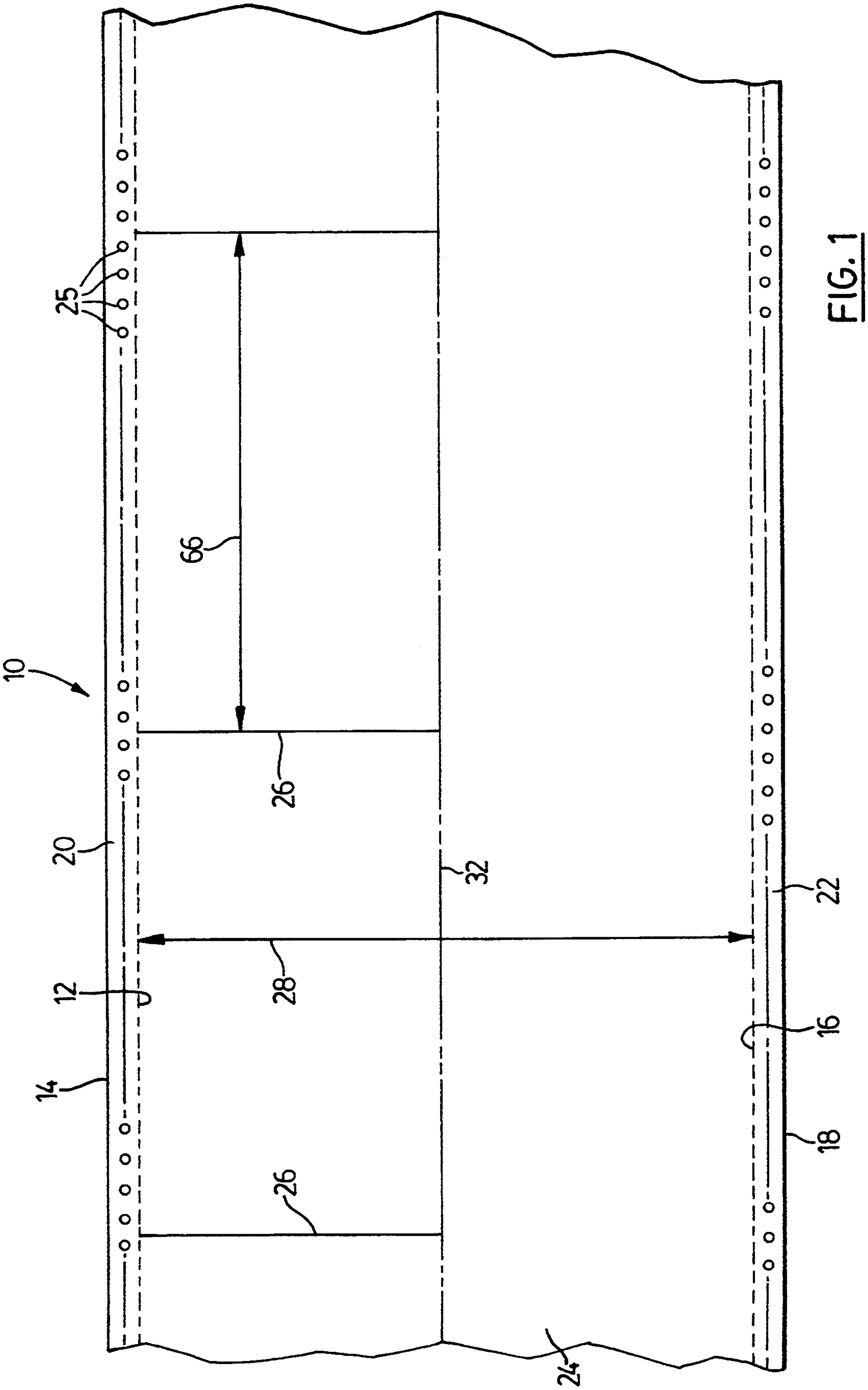
FIG. 1 is a plan view of a paper web made in accordance with this invention.

Turning to FIG. 1, a paper web 10 has a longitudinal line of perforation 12 proximate one side 14 of the web and a second longitudinal line of perforation 16 proximate the other side 18 of the web. These longitudinal lines of perforation delimit marginal web portions 20 and 22. The marginal web portions each have longitudinal lines of pin holes 25 for tractor feeding of the web.

The longitudinal lines of perforation 12, 16 also form the edges of a continuous form portion 24 such that the continuous form portion 24 is interior of the marginal web portions 20, 22. The continuous form portion 24 of the web has a plurality of transverse lines formed by cuts 26. Cuts 26 extend from the longitudinal line of perforation 12 which delimits marginal web portion 20. The transverse cuts 26 are of uniform length and extend approximately one-half of the width 28 of the continuous form portion 24 of the web. The cuts are also spaced uniformly along the length of the web 10. There are no transverse cuts or perforations aligned with any of the cuts 26. A longitudinal scored line 32 extends along the inside end of cuts 26.

Each segment of the continuous form portion 24 between adjacent transverse cuts 26 is a sheet precursor 66 with the short (i.e. width) dimension of the sheet precursor being in line with the direction of travel of the web.

Figure 2:
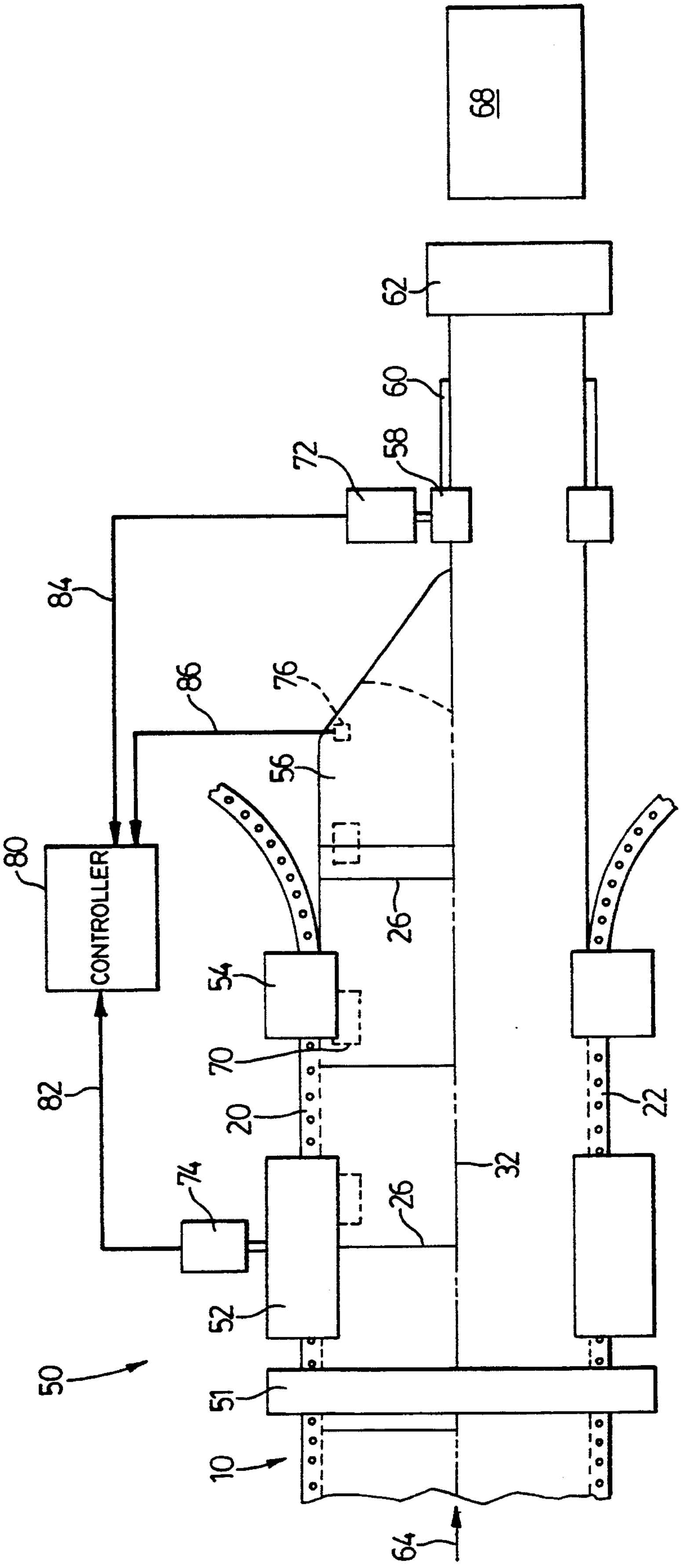
FIG. 2 shows an example machine using the paper web and continuous form of this invention.

The web 10 is adapted for use with machine 50 which is illustrated in FIG. 2. Referring to FIG. 2, machine 50 operates to move web 10 in a downstream direction 64 and comprises, in consecutive downstream order: a printing station 51, tractor feeders 52, edge portion slitters 54, folding plough 56, pinch rollers 58 with associated edge guides 60, and cutting station 62.

The plough 56 has a length which is one and one half to two times that of the longitudinal spacing between transverse cuts 26 of web 10. Furthermore, the plough may commence at the output of slitters 54 or, as shown, may be spaced downstream from the slitters 54.

The control system for the machine 50 comprises drive/tachometer 72 for driving pinch rollers 58 and for providing an indication of the speed of the pinch rollers, drive/tachometer 74 for driving tractor feed 52 and for providing an indication of the speed of the tractor feed, sensor 76 for sensing cuts 26, and controller 80 for receiving the output of the two encoders and the sensor on paths 82, 84, and 86 and for providing a drive control signal to the drive/tachometer 72 on path 84.

Figure 3:
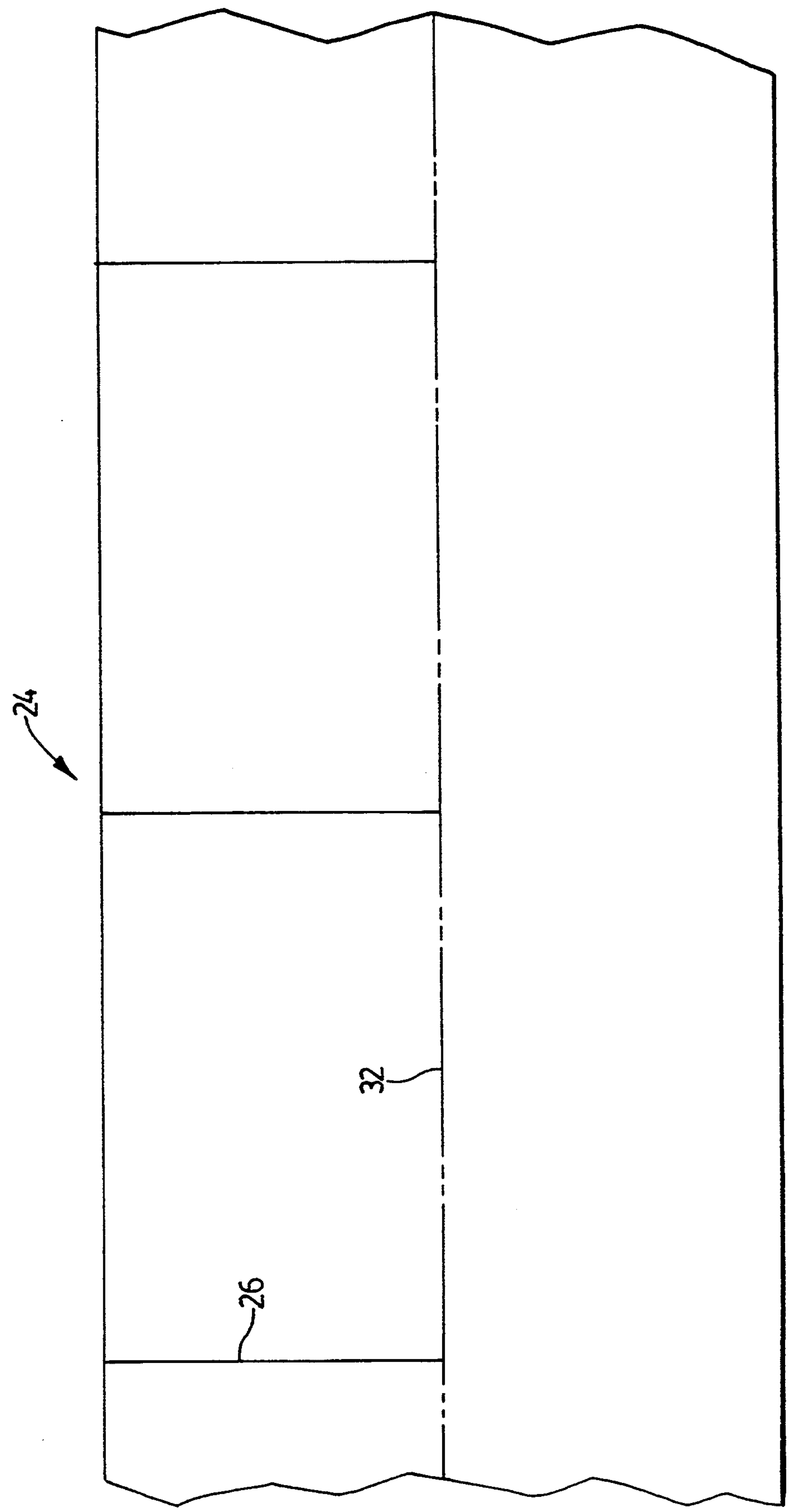
FIG. 3 is a plan view of a continuous form made in accordance with this invention.

In operation of the machine 50, printing station 51 may print text on each sheet precursor 66 including an address 70 in the top left corner of each sheet precursor. Tractor feeders 52 feed web 10 in the downstream direction 64 and pinch rollers 58 provide for the feeding of the continuous form downstream of the tractor feeders 52. At edge portion slitters 54, the edge portions 20 and 22 are separated off and discarded leaving the continuous form 24, as shown in FIG. 3. Downstream of slitters 54, the continuous form 24 is pulled through folding plough 56. Plough 56 acts on the portion of the continuous form 24 having cuts 26 to fold it under the remainder of the continuous form. The scored line 32 of the continuous form facilitates a clean fold.

Since plough 56 has a length which is one and a half to two times the distance between adjacent transverse cut lines, the fold is formed without risk of tearing, kinking or otherwise mutilating the continuous form. But the distance between adjacent pairs of transverse cuts simply defines the width of a sheet precursor 66. Accordingly, the length of the machine 50 which is required to fold a sheet precursor 66 is about twice the width of a sheet precursor. Since the width of a sheet precursor is typically 8½ inches the length required to fold is about 17 inches.

An indication of the speed with which tractor feed 52 moves web 10 inputs controller 80 on path 82. This signal is used as a control signal for the drive 72 of pinch rollers 58 so that the pinch rollers feed the web at the same speed as the tractor feed. Accordingly, the continuous form may be kept taut at the plough 56 by tractor feeders 52 and pinch rollers 58.

The folded continuous form 24 downstream of the plough 56 passes through the nip of pinch rollers 58 and is then kept in registration by edge guides 60. Pinch rollers 58 apply a positive downstream feeding tension on the continuous form. The folded continuous form then passes to cutter 62 which severs the continuous form at each of the transverse cuts to thereby form folded sheets 68 from the sheet precursors 66. It will be apparent that the sheet 68 has been folded so that the printed address faces outwardly from the underneath of the sheet.

While it is intended that pinch rollers 58 move web 10 at the same speed as tractor feed 52, the speed at which the pinch rollers move the web may vary slightly from that of the tractor feed; this may be due to a small discrepancy in the diameter of the pinch rollers from that of their nominal diameter. Such a speed variation would be cumulative, resulting in the web becoming increasing tight until it breaks or loosing until the web misfeeds through machine 50. These problems are avoided as follows. Sensor 76 senses each transverse cut 26 as each such cut passes over the sensor. The signal from the sensor passes to the controller on path 86. Also, the speed of the pinch rollers 58 as measured by the tachometer portion of driver/tachometer 72 pass to the controller 80 on path 84. The controller is programmed with the nominal diameter of the pinch roller to which the tachometer is attached and with the dimension (width) of each sheet precursor in the downstream direction of travel of the web 10, which is a constant. Knowing the speed and nominal diameter of the pinch roller, the controller may determine the nominal distance travelled by a point on the circumference of the pinch roller between any two pulses from the sensor 76. But two consecutive signals from the sensor 76 indicate that one sheet precursor 66 has passed the sensor. Consequently, if this nominal distance is not equal to the known width of a sheet precursor, it indicates that the pinch rollers are not moving the web at an identical speed to that of the tractor feed. More particularly, if the nominal distance is less than the width of sheet precursor then the pinch rollers are moving too slowly and, conversely, if the nominal distance is greater than the width of a sheet precursor, then the pinch rollers are moving too quickly. The controller uses this feedback signal to modify the speed of the drive of drive/tachometer 72 in order to achieve synchronism between the tractor feed and the pinch rollers.

Because the machine 50 folds in the direction of movement of the web rather than transversely thereto, it will be apparent that the web may be folded even where thick inserts have been adhered to the portion of the web 10 between marginal portion 22 and scored line 32. Furthermore, it will be noted that since the sheets 68 are cut only after folding, registration for folding is made simple since the continuous form is held in registration by tractor feeders 52, pinch rollers 58 and edge guides 60.

Figure 4:
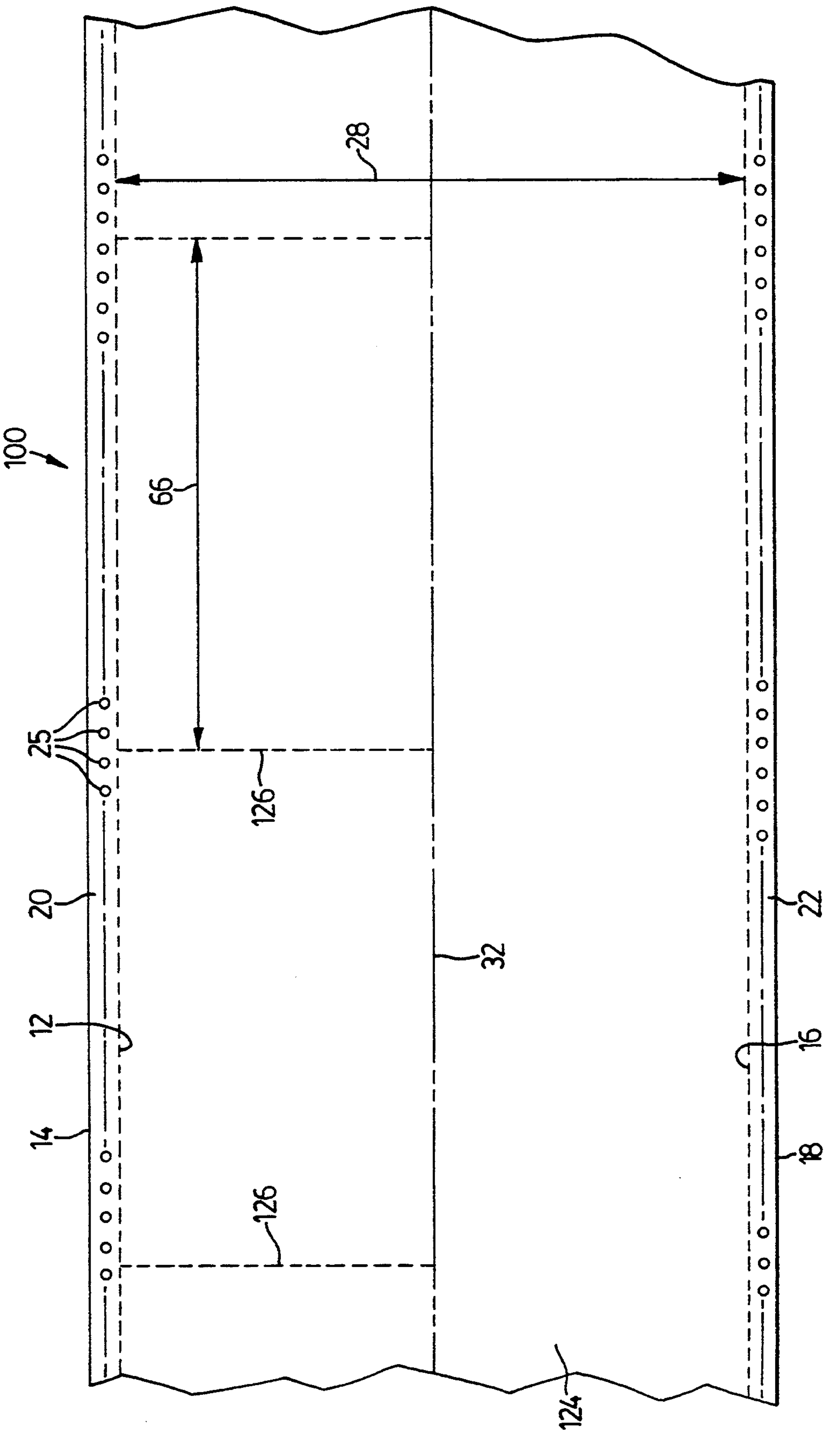
FIG. 4 is a plan view of a further embodiment of a paper web made in accordance with this invention.

FIG. 4 illustrates another embodiment of a paper web made in accordance with this invention. Turning to FIG. 4 wherein like parts have been given like reference numerals, web 100 has a continuous form portion 124 with a plurality of transverse lines formed by perforation lines 126. Perforation lines 126 extend from the longitudinal line of perforation 12. The transverse perforation lines 26 are of uniform length and extend approximately one-half of the width 28 of the continuous form portion 124 of the web. The perforation lines are also spaced uniformly along the length of the web 100. There are no transverse cuts or perforations aligned with any of the perforation lines 126.

The web 100 may be used with a machine similar to machine 50 in FIG. 2 except that a bursting station is added between slitters 54 and plough 56. This bursting station bursts perforation lines 126 of the continuous form 124 before the continuous form 124 encounters plough 56. Where a clean edge is required for letter sheets resulting from web 100, cutter 62 may be a double knife cutter which will cut the web on either side of each of the burst perforation lines 126.

Figure 5:
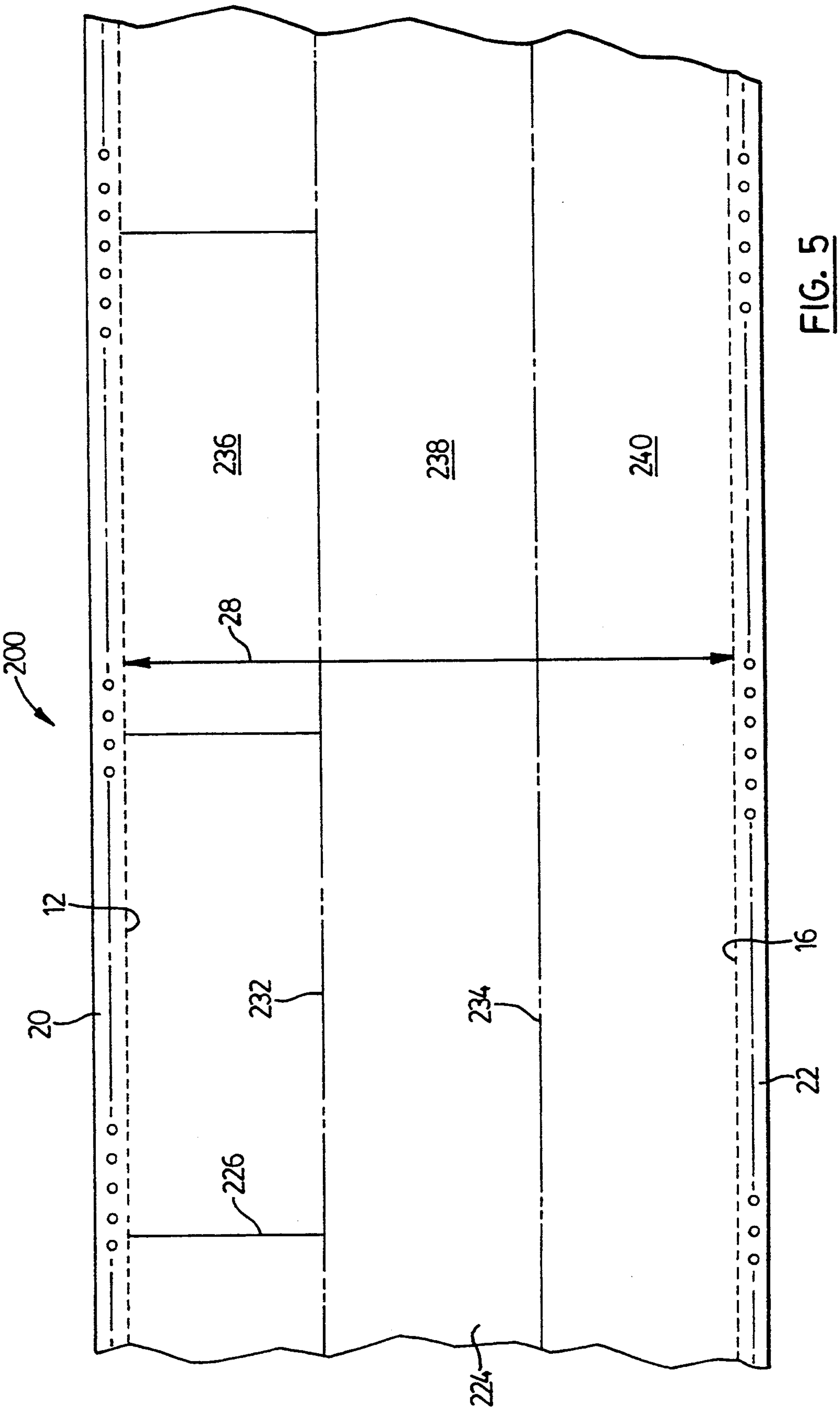
FIG. 5 is a plan view of a further embodiment of a paper web made in accordance with this invention.

FIG. 5 illustrates a further embodiment of a paper web made in accordance with this invention. Turning to FIG. 5 wherein like parts have been given like reference numerals, web 200 has a continuous form portion 224 with a plurality of transverse lines formed by cuts 226. Cuts 226 extend from the longitudinal line of perforation 12. The transverse cuts 226 are of uniform length and extend approximately one-third of the width 28 of the continuous form portion 224 of the web. The cuts are also spaced uniformly along the length of the web 200. There are no transverse cuts or perforations aligned with any of the perforation lines 226. A scored line 232 extends along the inner ends of the cuts 226. A further scored line extends along the web mid-way between scored line 232 and the longitudinal line of perforation 16. Consequently, scored lines 232 and 234 divide the continuous form portion 224 of the web into portions 236, 238, and 240, each of which is approximately one-third the width of the continuous form portion 224.

Web 200 may be used with a machine which is modified from the machine 50 of FIG. 2 so that in the run between slitters 54 and plough 56, portion 240 of the continuous form is folded over portion 238. The mechanics of this does not form part of the current invention; however one technique of accomplishing this is to greatly increase the length of the run between slitters 54 and plough 56 and progressively fold the web as it moves along this run. Then, at plough 56, portion 236 is folded under portion 238. The scored lines 232, 234 facilitate these folds.

Figure 6:
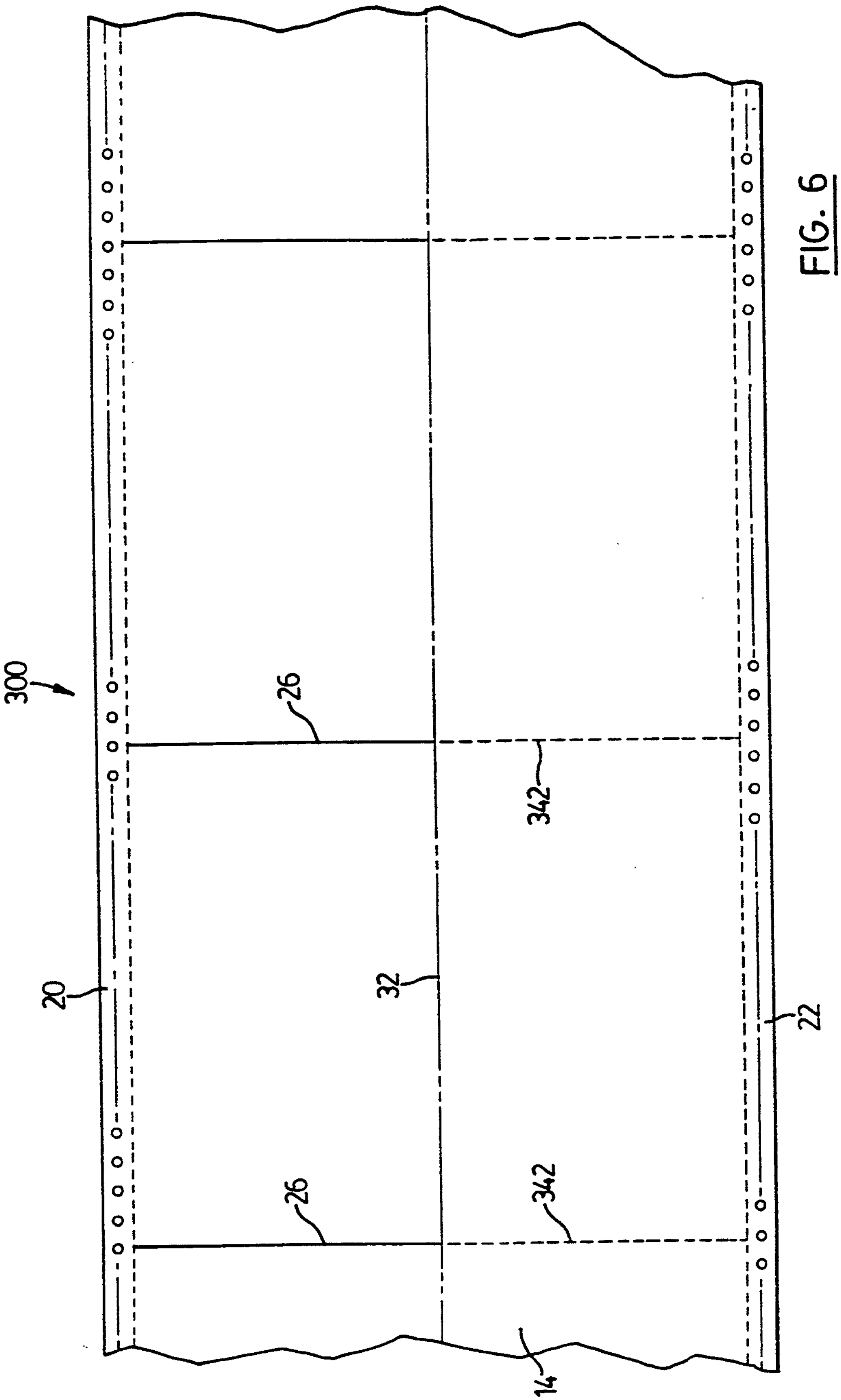
FIG. 6 is a plan view of a yet another embodiment of a paper web made in accordance with this invention.

FIG. 6 illustrates a further embodiment of a paper web made in accordance with this invention. Turning to FIG. 6 wherein like parts have been given like reference numerals, web 300 has a continuous form portion 324 with transverse cuts 26 extending from marginal web portion 20 and a transverse light line of perforation 342 extending from the inner end of each transverse cut 26 to marginal web portion 22. It will be readily apparent that the transverse cuts 26 are many times longer than any cut forming part of the light lines of perforation 342.

The web 300 may be used with a machine similar to machine 50 in FIG. 2 except that web tension must be more carefully controlled to ensure the web does not burst prematurely at perforation lines 342. Also, cutter 62 should be a double knife cutter which will cut the web on either side of each of the perforation lines 342. Where a clean edge is not critical, cutter 62 may be replaced with a burster.

While longitudinal scored lines 32 (FIG. 1, 4, and 6) and 232,234 (FIG. 5) are preferred, they are not necessary. Also, they may be replaced with perforation lines.

Other modifications will be apparent to those skilled in the art and, accordingly, the invention is defined in the claims.

What is claimed is:

1. A paper continuous form, comprising:
a first edge and an opposed second edge;
a plurality of linear transverse cuts, each of said cuts extending in said continuous form from said first edge, said plurality of transverse cuts being of uniform length and being uniformly longitudinally spaced along said continuous form;
a transverse light line of perforation extending from the inner end of each transverse cut to said second edge of said continuous form;
each transverse cut being at least several times longer than any cut forming part of said light line of perforation.

2. The paper continuous form of claim 1 further comprising a longitudinal scored or perforated line extending along the inside end of all of said plurality of transverse cuts.

3. The paper continuous form of claim 2 wherein each of said transverse cuts extend about one-third to one-half of the width of said continuous form.

4. A paper web providing a continuous form, comprising:
two marginal web portions, one proximate each side of the web, for permitting feeding of the web;
a continuous form portion interior of said marginal web portions;
a plurality of linear transverse cuts extending in said continuous form portion of said web from one of said two marginal web portions, said plurality of transverse cuts being of uniform length;
a transverse light line of perforation extending from each transverse cut to the other of said two marginal web portions;
each transverse cut being at least several times longer than any cut forming part of said light line of perforation.

5. The paper web of claim 4 further comprising a longitudinal scored or perforated line extending along the inside end of said plurality of transverse cuts.

6. The paper web of claim 5 wherein said plurality of transverse cuts are uniformly longitudinally spaced along said web.

7. The paper web of claim 6 wherein each of said transverse cuts extend about one-third to one-half of the width of the continuous form portion of said web.

8. The paper web of claim 7 wherein said two marginal web portions each have a longitudinal array of pin holes for permitting tractor feeding of the web.

* * * * *